(12) United States Patent
Berke et al.

(10) Patent No.: US 9,568,966 B2
(45) Date of Patent: Feb. 14, 2017

(54) DYNAMIC POWER BUDGET ALLOCATION

(75) Inventors: Stuart Allen Berke, Austin, TX (US); George G. Richards, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 607 days.

(21) Appl. No.: 13/600,489

(22) Filed: Aug. 31, 2012

(65) Prior Publication Data

US 2014/0067139 A1    Mar. 6, 2014

(51) Int. Cl.
*G06F 1/32* (2006.01)
*G06F 1/26* (2006.01)

(52) U.S. Cl.
CPC ........................................ *G06F 1/26* (2013.01)

(58) Field of Classification Search
CPC ........ G06Q 50/06; H02J 3/14; Y02B 70/3225; G06F 1/26
USPC .......................................................... 700/291
See application file for complete search history.

(56) References Cited

U.S. PATENT DOCUMENTS

| | | | |
|---|---|---|---|
| 5,339,445 A * | 8/1994 | Gasztonyi ...................... | 713/324 |
| 7,984,311 B2 * | 7/2011 | Brumley et al. ............... | 713/300 |
| 8,006,112 B2 * | 8/2011 | Munjal et al. ................. | 713/324 |
| 2006/0265617 A1 * | 11/2006 | Priborsky ....................... | 713/320 |
| 2007/0049133 A1 * | 3/2007 | Conroy et al. ................. | 439/894 |
| 2007/0067656 A1 * | 3/2007 | Ranganathan et al. ........ | 713/320 |
| 2008/0114997 A1 * | 5/2008 | Chin .............................. | 713/321 |
| 2008/0155284 A1 * | 6/2008 | Shimohata et al. ........... | 713/300 |
| 2009/0077407 A1 * | 3/2009 | Akimoto ........................ | 713/340 |
| 2009/0138219 A1 * | 5/2009 | Bletsch et al. ................. | 702/60 |
| 2009/0193276 A1 * | 7/2009 | Shetty et al. .................. | 713/340 |
| 2011/0106326 A1 * | 5/2011 | Anunobi et al. .............. | 700/291 |

* cited by examiner

*Primary Examiner* — Kenneth M Lo
*Assistant Examiner* — Alan Chu
(74) *Attorney, Agent, or Firm* — Haynes and Boone, LLP

(57) ABSTRACT

A dynamic power budget allocation system includes a plurality of powered subsystems. A power system controller is coupled to the plurality of powered subsystems. The power system controller is operable, for each of a plurality of time intervals, to retrieve power usage data from each of the plurality of subsystems during a current time interval. The power system controller is then operable to project power requirements for the plurality of subsystems for a subsequent time interval using the power usage data. The power system controller is then operable to determine at least one power setting for at least one of the plurality of subsystems using the power requirements, and program the at least one of the plurality of subsystems with the at least one power setting. Each powered subsystem may include a voltage regulator that provides the power usage data and is programmed with the at least one power setting.

20 Claims, 7 Drawing Sheets

DYNAMIC POWER BUDGET ALLOCATION

BACKGROUND

The present disclosure relates generally to information handling systems, and more particularly to dynamic power budget allocation when powering an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The power requirements of IHSs are steadily increasing. For example, as processors have added cores and other processing features, the sustainable power requirements, dynamic power requirements, and peak power requirements of the power system have increased. Traditionally, processor thermal design power (TDP) has been used for (indefinitely) sustainable power requirement budgeting purposes, and only a small amount of additional power was budgeted for dynamic power requirements and peak power requirements that are above the TDP of the processor. However, as the number of processor cores has increased (from 1, to 2, to 4, to 8, and to 10 and higher), the ability of all cores to simultaneously transition from an idle state to an active state has driven the dynamic power requirements and peak power requirements rapidly relative to the sustainable power requirements. For example, maximum or peak power ("$P_{max}$", typically sustainable on the order of milliseconds to tens of milliseconds) has grown from 1.3×TDP, to 1.6×TDP, and up to 2.2×TDP, and dynamic power ("$P_{dyn}$", typically sustainable on the order of hundreds of milliseconds to seconds) has grown from 1.0×TDP, to 1.2×TDP, to 1.6×TDP for some processors in the last 5 years. Processor cores and other computing elements can activate on the order of nanoseconds, which is orders of magnitude faster than conventional monitoring and throttling mechanisms can respond.

Worst case theoretical dynamic power requirements and peak power requirements are typically determined to describe all possible processor usage models, including those that are very unlikely or that may only be realized by a small subset of users and applications. For example, worst case theoretical requirements may consider a small subset of the processor instruction set that is only used in specific high performance computing (HPC) workloads, "thermal virus" level code segments that require micro-architectural knowledge to generate, worst case processor operating parameters (e.g., worst case voltage, temperature, process, etc.), 100% processor/system utilization (typical utilization is between 30-70%), and/or a variety of other worst case scenarios known in the art. As these worst case theoretical dynamic power requirements and peak power requirements have grown, the difference between the actual or measured dynamic power requirements and peak power requirements and those worst case theoretical requirements has grown as well.

Furthermore, denser systems are requiring more and more from the power system. Conventional servers today have 2 to 4 processors, with newer designs having 4 to 8 processors and some emerging architectures having dozens of processors. Other computing elements such as memory, graphics controllers, co-processors, network controllers, drives, etc. are also dramatically increasing their dynamic and peak power requirements compared to their "TDP" or sustainable power requirements. These other computing elements may have dynamic and peak power requirements that have substantially different durations and duty cycles than those required by processors.

As the number of processors and other high-power devices in the system grows, it becomes less and less feasible to budget the power system based on theoretical dynamic power requirements and peak power requirements, as those theoretical requirements drive excessive power systems that are costly, inefficient, and difficult (if not impossible) to implement.

Accordingly, it would be desirable to provide an improved power system for IHSs.

SUMMARY

According to one embodiment, a dynamic power budget allocation system includes a plurality of powered subsystems; and a power system controller coupled to the plurality of powered subsystems, wherein the power system controller is operable, for each of a plurality of time intervals, to: retrieve power usage data from each of the plurality of powered subsystems during a current time interval; project power requirements for the plurality of powered subsystems for a subsequent time interval using the power usage data; determine at least one power setting for at least one of the plurality of powered subsystems using the power requirements; and program the at least one of the plurality of powered subsystems with the at least one power setting.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
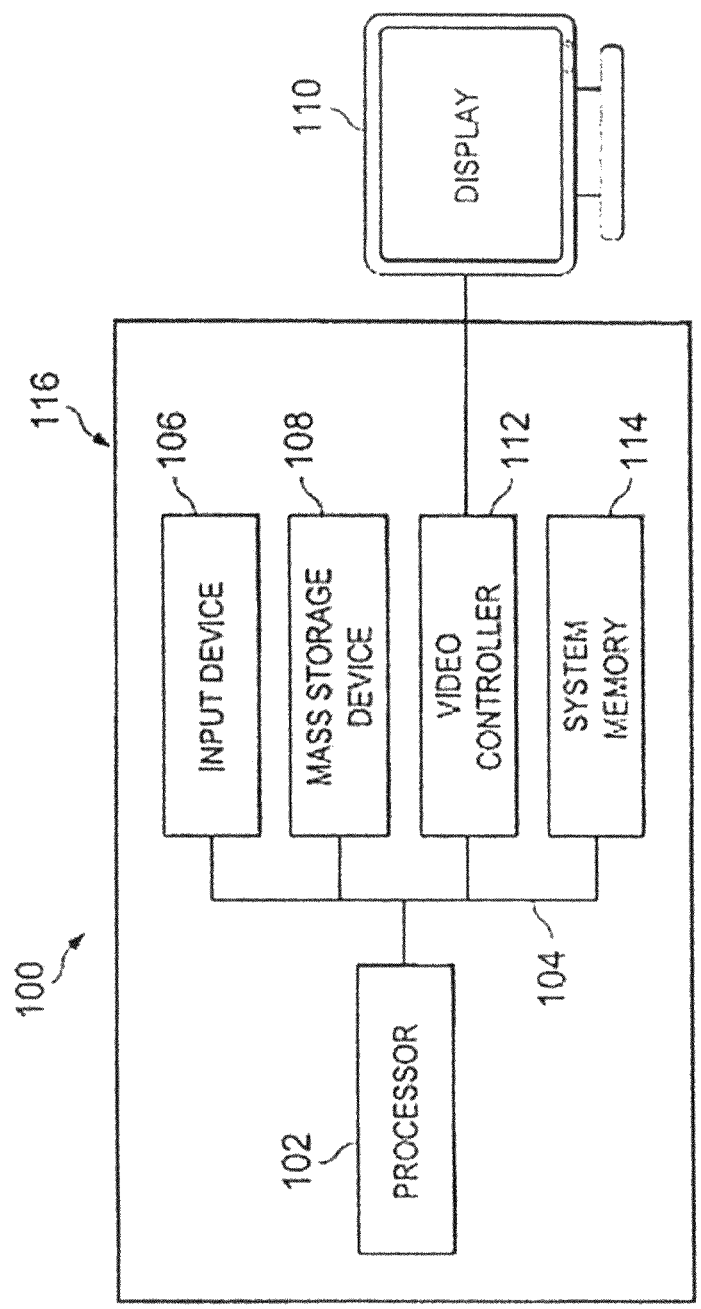
FIG. 1 is a schematic view illustrating an embodiment of an information handling system.

In one embodiment, an IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
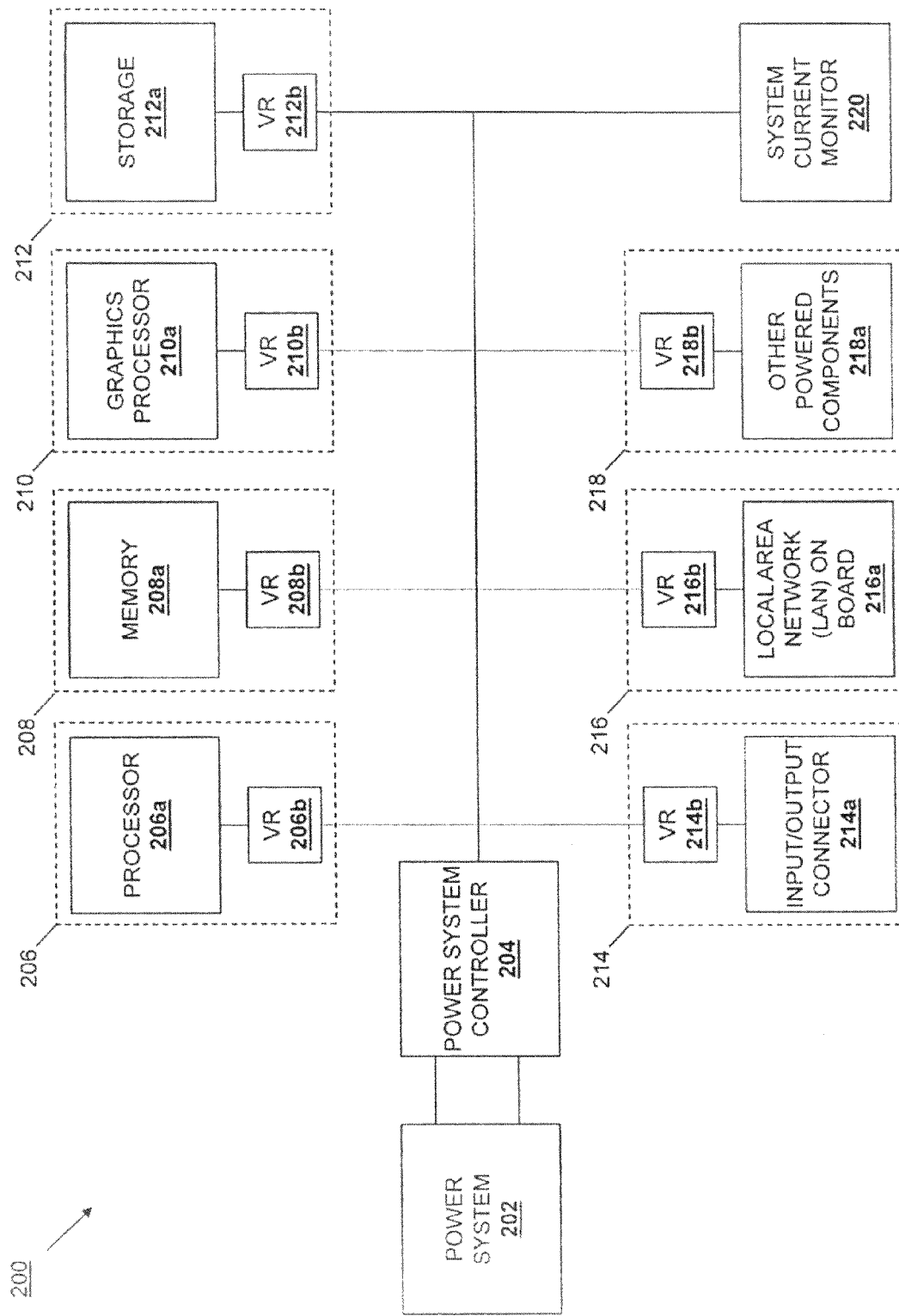
FIG. 2 is a schematic view illustrating an embodiment of a dynamic power budget allocation system.

Referring now to FIG. 2, an embodiment of a dynamic power budget allocation system 200 is illustrated. As discussed in further detail below, the power budget allocation system 200 may be implemented in or with a variety of IHS's known in the art. For example, the power budget allocation system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the power budget allocation system 200 may be implemented as a modular IHS such as, for example, a blade server. As such, in some embodiments, all of the elements in the power budget allocation system 200 may be housed in an IHS chassis (e.g., the chassis 116 discussed above with reference to FIG. 1), while in other embodiments, elements of the power budget allocation system 200 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The power budget allocation system 200 includes a power system 202, which may include one or more PSUs, PDUs, and/or a variety of other power system components known in the art. The power system 202 may be housed in an IHS chassis with the some or all of the components of the power budget allocation system 200, coupled to an IHS chassis that houses some or all of the remaining components of the power budget allocation system 200, and/or partially housed in and partially coupled to an IHS chassis that houses some or all of the components of the power budget allocation system 200. In one embodiment, the power system 202 is operable to receive Alternating Current (AC) power, convert it to Direct Current (DC) power (e.g., with a voltage of approximately 12.2 volts), and supply the DC power to the powered subsystems in an IHS. In one experimental example, the power system 202 was operable to provide 1000 watts of DC power indefinitely, 1300 watts of DC power for up to 100 milliseconds at a 25% duty cycle, and 1500 watts of DC power for up to 5 milliseconds at a 10% duty cycle. However, one of skill in the art will recognize that a power system may have one or more specifications for sustainable power and un-sustainable power/duration/duty cycle operating points, and a variety of different power systems operating in a variety of different manners with a variety of durations and duty cycles are envisioned as falling within the scope of the present disclosure. Regardless of the details of the power system, the power budget allocation system of the present disclosure is operable to budget power based on power system capabilities and the processor and other device requirements over different time scales.

The power system 202 is coupled to a power system controller 204. In an embodiment, the power system controller 204 may include a Baseboard Management Controller (BMC), a dedicated microcontroller, an operating system (OS) agent, and/or a variety of other system power management entities known in the art. The power system controller 204 is coupled to a plurality of powered subsystems that, in the illustrated embodiment, include a processor subsystem 206 that includes at least one processor 206a and processor voltage regulator 206b, a memory subsystem 208 that includes at least one memory device 208a and memory device voltage regulator 208b, a graphics processor subsystem 210 that includes at least one graphics processor 210a and graphics processor voltage regulator 210b, a storage subsystem 212 that includes at least one storage device 212a and storage device voltage regulator 212b, an Input/Output (I/O) subsystem 214 that includes at least one I/O connector 214a and an I/O device voltage regulator 214b, a Local Area Network (LAN) on motherboard (LOM) subsystem 216 that includes at least one LOM 216a and a LOM voltage regulator 216b, and/or one or more other powered subsystems 218 that include one or more other powered components 218a and one or more other powered component voltage regulators 218b. While each of the powered subsystems in the illustrated embodiment includes a voltage regulator for its powered component, one of skill in the art will recognize that some powered components may include dedicated voltage regulators while other powered components may share a voltage regulator provided for the powered components and/or included in the power system 202. In some embodiments, a system current monitor 220 is coupled to the power system controller 204 and is operable to determine the power demands for some or all of the powered subsystems.

In a specific embodiment, the power system controller 204 is coupled to each of the powered subsystems through a PMBus (or equivalent) connected Point of Load (POL) voltage regulator provided at each critical powered subsystem. For example, the power system controller 204 may be coupled to the critical powered subsystems that demand a majority of the power budget of the power system 202 and/or that have the largest dynamic power and peak power requirements (e.g., power demand spikes), such as the processor subsystem 206 (e.g., through the processor voltage regulator 206b) and the memory subsystem 208 (the memory voltage regulator 208b). However, the power system controller 204 may be coupled to any or all of the processor voltage regulator 206b, the memory voltage regulators 208b, the graphics processor voltage regulator 210b, the storage voltage regulator 212b, the Input/Output (I/O) voltage regulator 214b, the LOM voltage regulator 216b, and/or the one or more other powered component voltage regulators 218b to provide the functionality discussed below.

Figure 3:
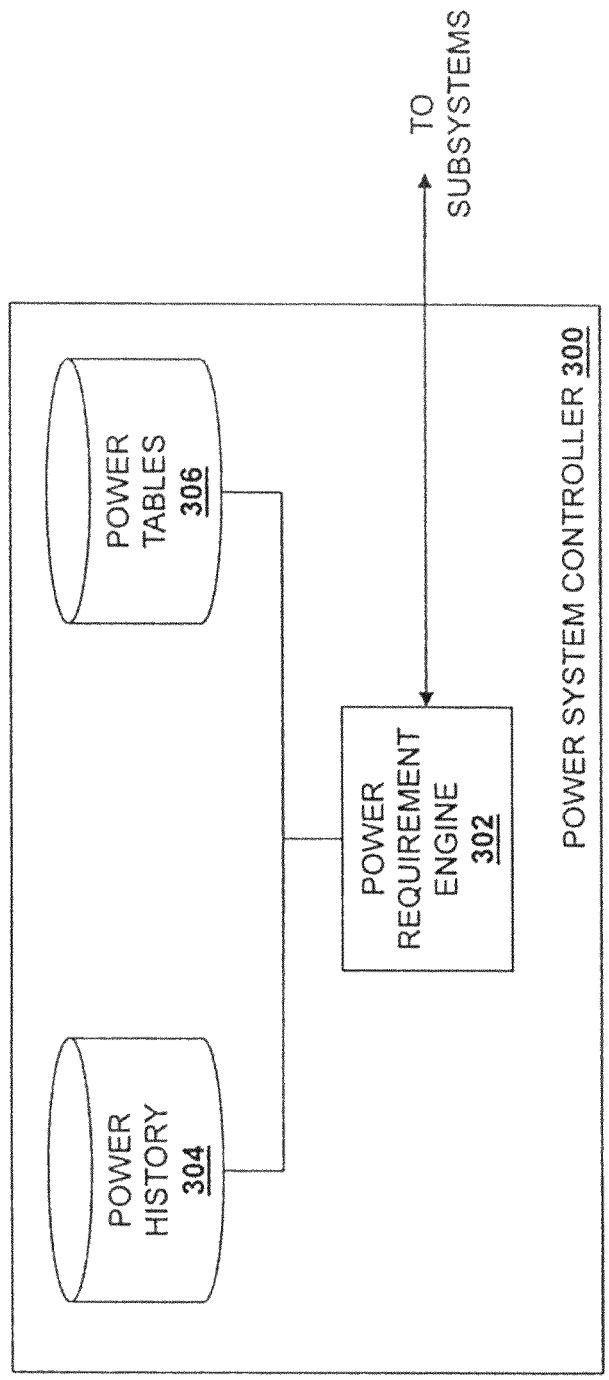
FIG. 3 is a schematic view illustrating an embodiment of a power system controller used in the dynamic power budget allocation system of FIG. 2.

Referring now to FIG. 3, an embodiment of a power system controller 300 is illustrated that may be the power system controller 204 discussed above with reference to FIG. 2. As discussed in further detail below, the power system controller 204/300 is operable to periodically, continually, and/or constantly poll the system (e.g., the system current monitor 220) and/or the powered subsystems (e.g., the processor subsystem 206, the memory subsystem 208, the graphics processor subsystem 210, the storage subsystem 212, the Input/Output (I/O) subsystem 214, the LOB subsystem 216, and/or the one or more other powered subsystems 218) in the power budget allocation system 200 to determine how power is being used in the system. The power system controller 204 may be operable to perform real-time or near-real-time telemetry measurement through interfaces with the system and/or subsystems that may include standard interfaces (e.g., Power Management Bus (PMBus) interfaces, System Management Bus (SMBus) interfaces, Inter-Integrated Circuit ($I^2C$) interfaces, and/or a variety of other standard interfaces known in the art), proprietary interfaces (e.g., an Intel® SVID interface), and/or a variety of other interfaces known in the art. The power system controller 204/300 may interface with the system current monitor 220, the voltage regulators in the powered subsystems, and/or other power conversion and/or detection elements throughout the power budget allocation system 200. In one embodiment, the real-time or near-real-time telemetry measurement conducted by the power system controller 204/300 may be realized using a power capping algorithm that performs measurements at a rate of approximately once per millisecond (ms). However, in another embodiment, even faster measurement rates may be realized using a system management entity such as, for example, a Node Manager provided by Intel®, that provides a faster polling rate that allows measurements to be processed approximately 10 times faster (e.g, once per 100 microseconds (μs)).

In the illustrated embodiment, the power system controller 300 includes or is coupled to a power requirement engine 302 that may include instructions that are stored on a non-transitory, computer-readable medium and that, when executed by a processor, cause the processor to monitor operation of the system and/or powered subsystems, retrieve power usage data from the powered subsystems, project power requirements of the powered subsystems, determine power settings for the powered subsystems, program the powered subsystems, and/or provide any of the other functionality of the power system controller 204/300 discussed below. The power requirement engine 302 is coupled to a power history database 304 and a power tables database 306, which may be included in the power system controller 300, located in an IHS coupled to the power system controller 300, and/or coupled to the power system controller 300 over a network. As discussed in further detail below, the power history database 304 may include power usage data collected during one or more prior time intervals (e.g., prior to a current performance of the method 600, discussed below). As also discussed in further detail below, the power tables database 304 may include worst-case dynamic power requirements and peak power requirements for the powered subsystems in a variety of different scenarios.

The power budget allocation system 200 takes advantage of the fact that the powered subsystems will rarely, if ever, operate at 100% utilization simultaneously, and monitors those powered subsystems regularly to continually reallocate power from the power system 202 to the powered subsystems dynamically as the power requirements of those powered subsystems change. In particular, the powered subsystems will rarely, if ever, perform dynamic power excursions and peak power excursions simultaneously, and thus monitoring those powered subsystems allows interval-to-interval power reallocation and subsystem control to avoid system and subsystem level peaks that can exceed the power output capability of the power system 202, while also mitigating powered subsystem performance impacts that are typically associated with subsystem power limiting operations.

Figure 4:
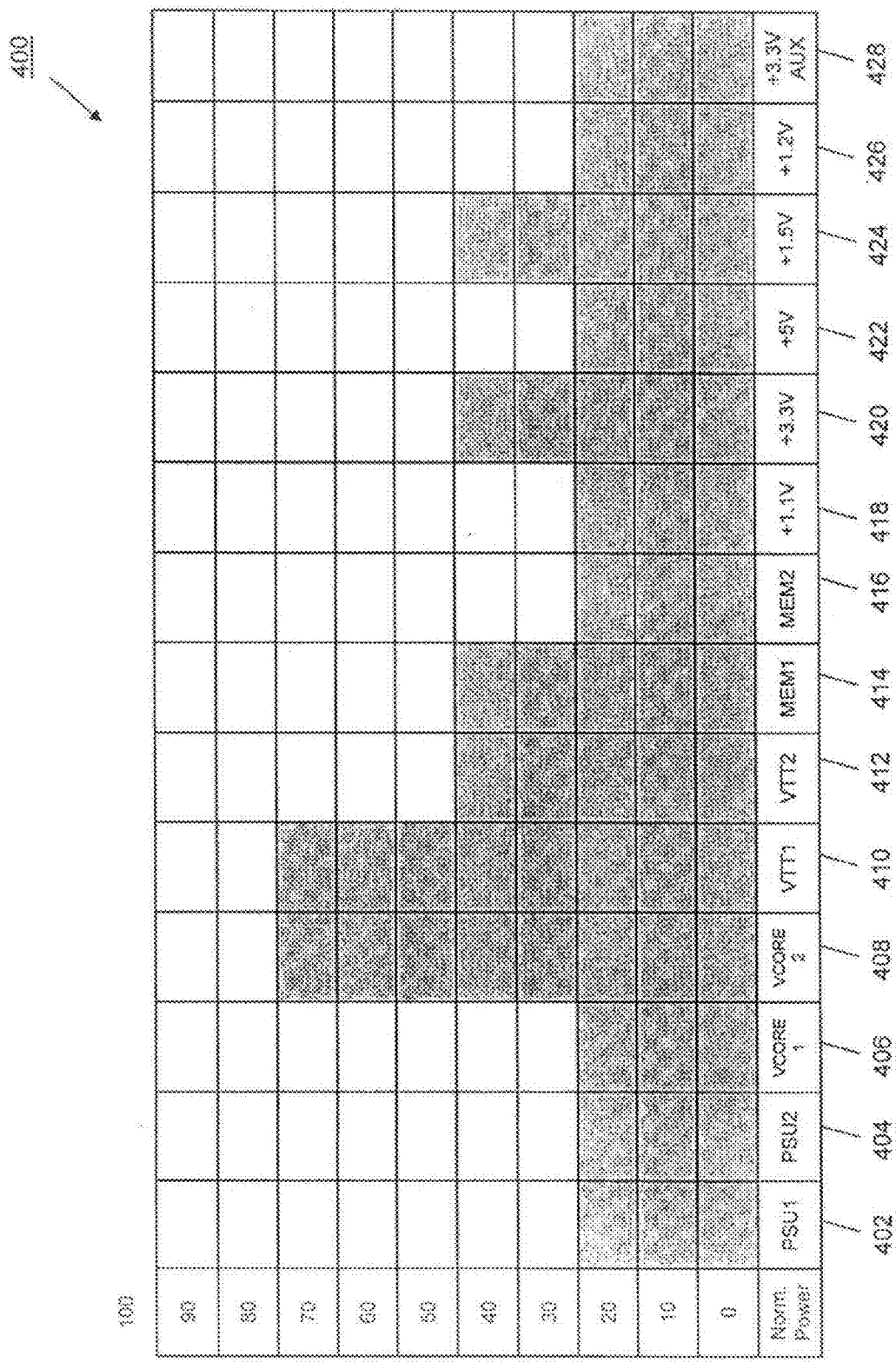
FIG. 4 is a graph illustrating an embodiment of a snapshot of power usage data for powered subsystems in an IHS.

FIG. 4 illustrates a graph 400 including power usage data that provides a snapshot of power usage by a plurality of powered components in an IHS at a particular time. The graph 400 includes a plurality of IHS subsystems along the x-axis including a first power supply 402 (PSU1), a second power supply 404 (PSU2), a first processor core 406 (VCORE1), a second processor core 408 (VCORE2), a first memory controller 410 (VTT1), a second memory controller 412 (VTT2), a first memory device 414 (MEM1), a second memory device 416 (MEM2), a first power rail 418 (+1.1V), a second power rail 420 (+3.3V), a third power rail 422 (+5V), a fourth power rail 424 (+1.5V), a fifth power rail 426 (+1.2V), and an auxiliary power rail 428 (+3.3AUX). The y-axis of the graph includes a normalized (0-100%) full load power amount. The graph 400 illustrates the variety of different power that may be drawn by the different subsystems in an IHS at any particular time, with the second processor core 408 and the first memory controller 410 at 80% full load power; the second memory controller 412, the first memory device 414, the second power rail 420, and the fourth power rail 424 at 50% full load power; and the rest of the subsystems at 30% full load power. While VTT1 and VTT2 have been used in the above embodiment as the first memory controller 410 and second memory controller 412, one of skill in the art will recognize that VTT may refer to the processor "uncore" voltage that may include all portions of the processor die voltage that is not for the cores including, for example, voltage for the memory controllers I/O controllers, caches, fabric interconnect controllers, switches, and/or other IHS functions known in the art.

Figure 5:
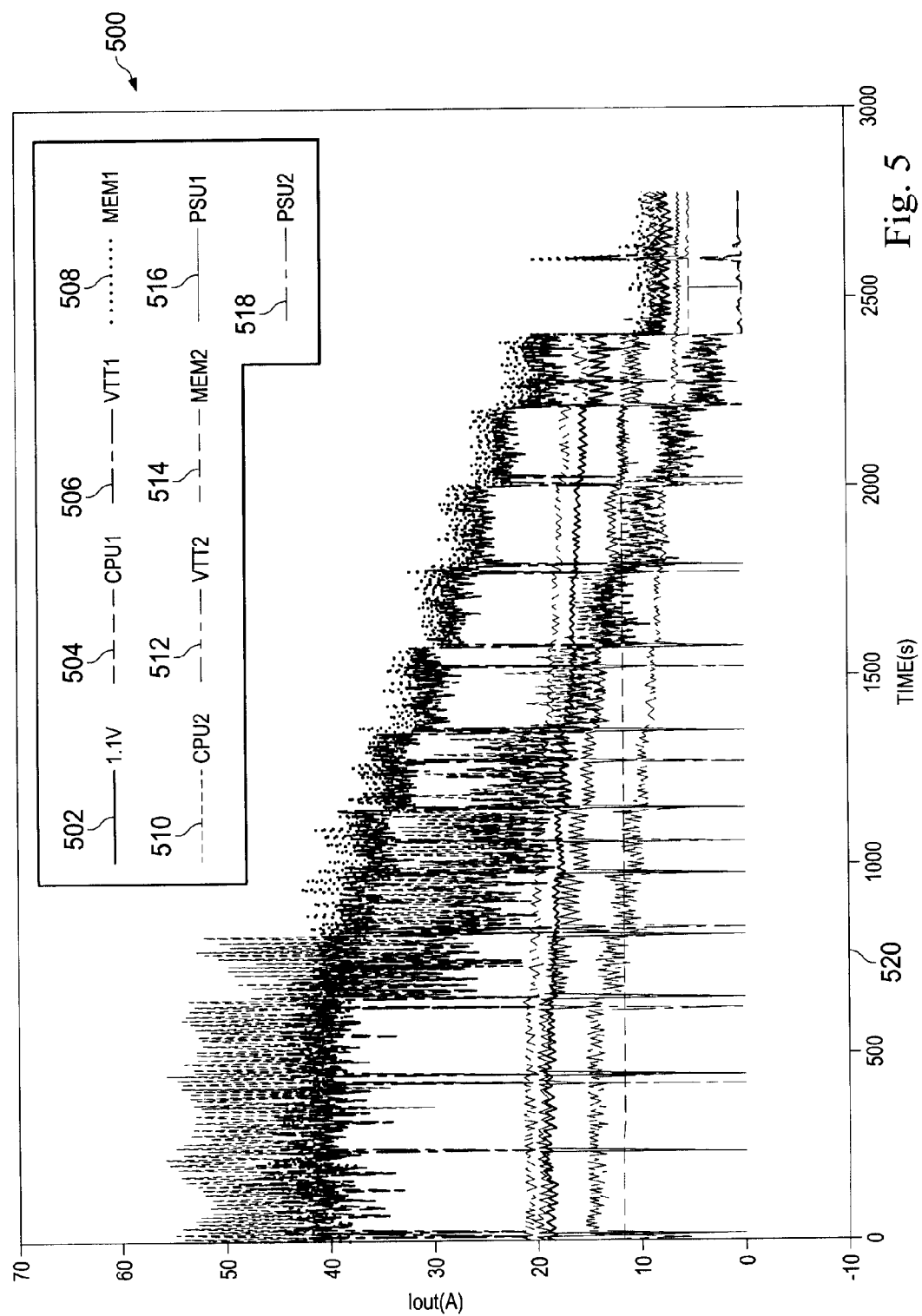
FIG. 5 is a graph illustrating an embodiment of power usage data for a plurality of powered subsystems in an IHS over time.

FIG. 5 illustrates a graph including power usage data that provides power usage of power subsystems in an IHS for an application run over a time period. The graph 500 includes time along the x-axis and current draw along with the y-axis, with the current draw vs. time plotted for plurality of IHS subsystems including a first power rail 502 (+1.1V), a first processor 504 (CPU1), a first memory controller 506 (VTT1), a first memory device 508 (MEM1), a second processor 510 (CPU2), a second memory controller 512 (VTT2), a second memory device 514 (MEM2, a first power supply voltage 516 (PSU1), and a second power supply voltage 518 (PSU2). The graph 500 illustrates the variety of different power amounts that may be drawn by the different powered subsystems in an IHS over time during IHS operation (e.g., during the running of an application), with different subsystem drawing more and less power than each other depending on the time (e.g., the first processor 504 and the second processor 510 drawing the most power in the system from application start to time 520, but then dropping in power draw below the first memory controller 506 and first memory device 508 subsequent to time 520).

Figure 6:
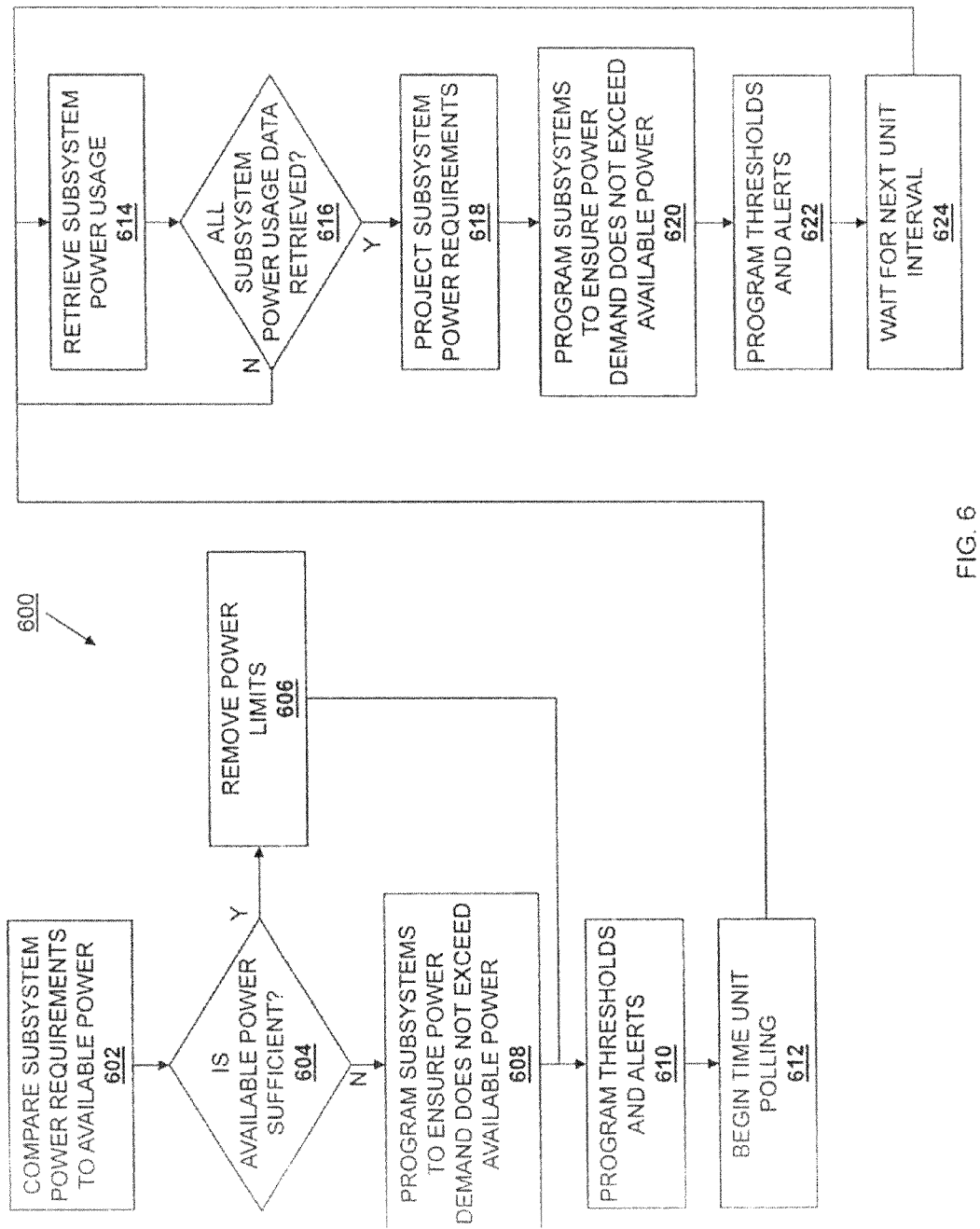
FIG. 6 is a flow chart illustrating an embodiment of a method for dynamically allocating a power budget.

Referring now to FIGS. 2, 3, and 6, a method 600 for managing power is illustrated. The method 600 begins at block 602 where powered subsystem power requirements are compared to the available power. In an embodiment, the power system controller 204 compares the dynamic power requirements and/or the peak power requirements of the powered subsystems to the power available from the power supply unit(s) (PSU(s)), power distribution unit(s) (PDU(s)), and/or other power components in the power system 202. For example, upon IHS startup (e.g., during a Power-On Self Test (POST)) the power system controller 204 may retrieve the theoretical dynamic and peak power requirements for the powered subsystems at block 602 of the method 600. The power system controller 204 may then retrieve power output capability data from the power system 202 over, for example, via PMBus, and compare that power output capability data (e.g., each power/duration/duty cycle supported) to the theoretical maximum dynamic and peak power requirements of the powered subsystems (e.g., for each respective power/duration/duty cycle that is applicable.)

The method 600 then proceeds to decision block 604 where it is determined whether the available power is sufficient. In an embodiment, the power system controller determines whether the power available from the power system 202 is sufficient to allow unconstrained operation of the powered subsystems, including operation according to the theoretical dynamic power requirements and/or theoretical peak power requirements RETRIEVED at block 602. If the power system controller 204 determines that the power available from the power system 204 is sufficient, the method 600 proceeds to block 606 where system power limits are removed. In an embodiment, at block 606, the power system controller 204 may remove and/or disable any performance state caps (e.g., on the processor system 206), bandwidth caps (e.g., on the memory subsystem 208), and/or other power limits on the powered subsystems. The method 600 may then proceed to block 610, discussed in further detail below. The remainder of the method 600 is discussed with regard to a determination at decision block 604 that the power available from the power system 202 is insufficient to allow unconstrained operation of the powered subsystems according to the theoretical dynamic power requirements and/or theoretical peak power requirements determined at block 602. Because block 606 of the method 600 is only performed if the available power is sufficient for unconstrained operation of the powered subsystems, the proceeding of the method 600 to blocks 610 and beyond in the method 600 following block 606 are not strictly necessary as even the theoretical maximum dynamic and/or peak power requirements of the system and/or powered subsystems will not exceed the power output capabilities of the power system 202. However, the real-time and/or near-real-time telemetry data determined at blocks 610 and beyond in the method 600 may be useful for other power optimizations (performance, performance per watt, etc.) and reporting usages, and thus the method flow illustrated as proceeding from block 606 should be interpreted in light of such power optimization and reporting goals when the power supply 202 is capable of providing all possible required power to the powered subsystems.

If, at decision block 604, it is determined that the available power is insufficient, the method 600 proceeds to block 608 where the powered subsystems are programmed to ensure that power demand does not exceed the available power. In an embodiment, at block 608, the power system controller 204 may determine and program at least one power setting for the powered subsystems that may include performance state caps, bandwidth caps, and/or other power limits for the powered subsystems to ensure that the operation of the powered subsystems does not produce the theoretical dynamic or peak power demands that were determined to exceed the power output capability of the power system 202 at decision block 604.

The method 600 then proceeds to block 610 where thresholds and alerts are programmed. In an embodiment, the power system controller 204 is operable to determine and program thresholds and alerts in the powered subsystem voltage regulators in the powered subsystems to detect when the power demand from the powered subsystems does not exceed the power output capability of the power system 202 and alert the system to prevent that from happening. For example, the power system controller 204 may program thresholds and alerts in the POL voltage regulators in each of the powered subsystems and/or in the system level current monitor 220 such that the system produces an alert if the power demand from any of the powered subsystems or combination of the powered subsystems produce a power demand that exceeds the power output capability of the individual POL voltage regulator or power system 202.

The method 600 then proceeds to block 612 where time unit polling begins. Thus, in an embodiment, blocks 602-612 set up the powered subsystems for operation that may be constrained by the theoretical maximum dynamic and/or peak power requirements of the powered subsystems. As discussed in further detail below, following block 612 where time unit polling begins, the operation of one or more of the powered subsystems may be adjusted for each subsequent time interval based on the operation of the powered subsystems in a current time interval in order to provide the highest performance possible by the powered subsystems while ensuring that the power demand from the powered subsystems does not exceed the power output capability of the power system 202.

The method 600 then proceeds to block 614 where powered subsystem power usage data is retrieved. In an embodiment, the power system controller 204 polls or otherwise retrieves from each powered subsystem (e.g., from the POL voltage regulator in each powered subsystem) an average power, a peak power (or peak current), any programmed threshold crossings (including warning thresholds, danger thresholds, critical thresholds, and/or other thresholds known in the art), a slew rate, any enabled phases, and/or a variety of other power usage data known in the art, and may store that power usage data in the power history database 304. Power usage data retrieved during a current time interval may be referred to as current power usage data, while power usage data retrieved during one or more previous time intervals may be referred to a prior power usage data. Following block 614, the method 600 proceeds to decision block 616 where it is determined whether all powered subsystem power usage data has been retrieved. In an embodiment, the power system controller 204 may retrieve power usage data from all of the powered subsystems in its performance of block 614 and decision block 616, as if the power system controller 204 determines that all powered subsystem power usage data is not retrieved at decision block 616, the method 600 returns to block 614 to retrieve the unretrieved powered subsystem power usage data.

If, at decision block 616, the power system controller 204 determines that all powered subsystem power usage data has been retrieved, the method 600 proceeds to block 618 where powered subsystem power requirements are projected. In an embodiment, the power system controller 204 is operable to use the current power usage data for the current time interval to project the power requirements for the subsequent time interval and otherwise characterize the powered subsystems operation in the current time interval and/or subsequent time interval. For example, determining the current power state of the powered subsystems (e.g., CPU Pn (processor performance state n), DDR Self-Refresh (memory is in self refresh state), CPU C1E (processor is in the Corel E idle state), HBA PCIe L0s (host bus adapter/add-in device PCIe link is in the L0's standby state), etc., and/or a current power consumption of the powered subsystems during a current time interval allows the power system controller 204 to determine an upper bound on how high the dynamic and peak power demand for those powered subsystems can reach in a subsequent time interval. In a specific example, if a Dual Data Rate (DDR) channel in the memory subsystem 208 is determined to be in a Self-Refresh mode during the current time interval, the power system controller 204 will determine that at least 512 DDR clock cycles (i.e., ~500 ns) will need to pass to return to an active state. In another specific example, if a processor in the processor subsystem 206 is its lowest performance state during a current time interval, the power system controller 204 may determine that that processor is limited to transitioning up to a particular bounded higher power performance state within the next 50 µs. In yet another specific example, if a hard drive in the storage subsystem 212 is in a low RPM idle state at a current time interval, the power system controller 204 may determine that it will take several seconds for that hard drive to spin up to an active state. The power system controller 204 may use these and similar pieces of power usage data to project the power requirements of the powered subsystems in the subsequent time interval. Furthermore, while a few specific examples of power usage data used for projecting powered subsystem power requirements have been provided, one of skill in the art will recognize that a wide variety of power usage data may be used to project powered subsystem power requirements for a subsequent time interval.

In an embodiment, the power system controller 204 is operable to use powered subsystem characterizations determined from the power usage data in block 614, power tables in the power tables database 306, and/or power histories for the powered subsystem in the power history database 304 to project the expected and worst case power requirements of the powered subsystems for the subsequent time interval. For example, the powered subsystem characterizations and power tables may be used to determine the worst case dynamic and peak power requirements that can occur in the subsequent time interval based on the current operating state of the powered subsystems, and power from the power system 202 may then be allocated to the powered subsystems based on those worst case dynamic and peak power requirements for the subsequent time interval. In an embodiment, the power system controller 204 may use the current unit time interval average power, peak power, slew rates, and similar data from N prior time intervals to project the power requirements per POL voltage regulator for the subsequent time interval.

The method 600 then proceeds to block 620 where the powered subsystems are programmed to ensure that their power demand does not exceed the available power. In an embodiment, the power system controller 204 may determine that the powered subsystems may operate at their worst case dynamic and peak power requirements that can occur in the subsequent time interval at block 620 and, in response, remove any power limits on the powered subsystems. In another embodiment, the power system controller 204 may determine that if the powered subsystems operate at their worst case dynamic and peak power requirements that can occur in the subsequent time interval at block 620, the power output capabilities of the power system 202 will be exceeded and, in response, program at least one power setting in one or more of the powered subsystems to ensure that the power output capabilities of the power system 202 are not exceeded. For example, the power system controller 204 may determine and program power settings for one or more of the powered subsystems that may include performance state caps, bandwidth caps, and/or other power limits for the powered subsystems to ensure that the operation of the powered subsystems does not produce dynamic or peak power demand that exceeds the power output capability of the power system 202.

The method 600 then proceeds to block 622 where thresholds and alerts are programmed. In an embodiment, the power system controller 204 is operable to determine and, if necessary, program thresholds and alerts in the powered subsystem voltage regulators in the powered subsystem to ensure that the power demand from the powered subsystems does not exceed the power output capability of the power system 202. For example, the power system controller 204 may program thresholds and alerts in one or more of the POL voltage regulators in each of the powered subsystems and/or in the system level current monitor 220 such that the system produces an alert if the power demand from any of the powered subsystems or combination of the powered subsystems produce a power demand that exceeds the threshold.

The method 600 then proceeds to block 624 where it waits for the next time interval, and then proceeds back through blocks 614-622. Thus, in an embodiment, the power system controller 204 is operable, for each of a plurality of time intervals, to retrieve power usage data during a current time interval for each of the plurality of powered subsystems, project the powered subsystem power requirements for a subsequent time interval based on their operation during the current time interval (and, in some embodiments, powered subsystem power usage histories and/or power tables describing the worst case power requirements that can result in light of the current operating state of powered components), program the powered subsystems to ensure that their power demands do not exceed the power output capability of the power system 202 during the subsequent time interval, and program thresholds and alerts in the powered subsystems during the subsequent time interval. As such, the method 600 dynamically allocates the power budget of the power system 202 for a plurality of time intervals based on the powered subsystem current operation (and dynamic and peak power requirements limits that are associated with that current operation).

Figure 7:
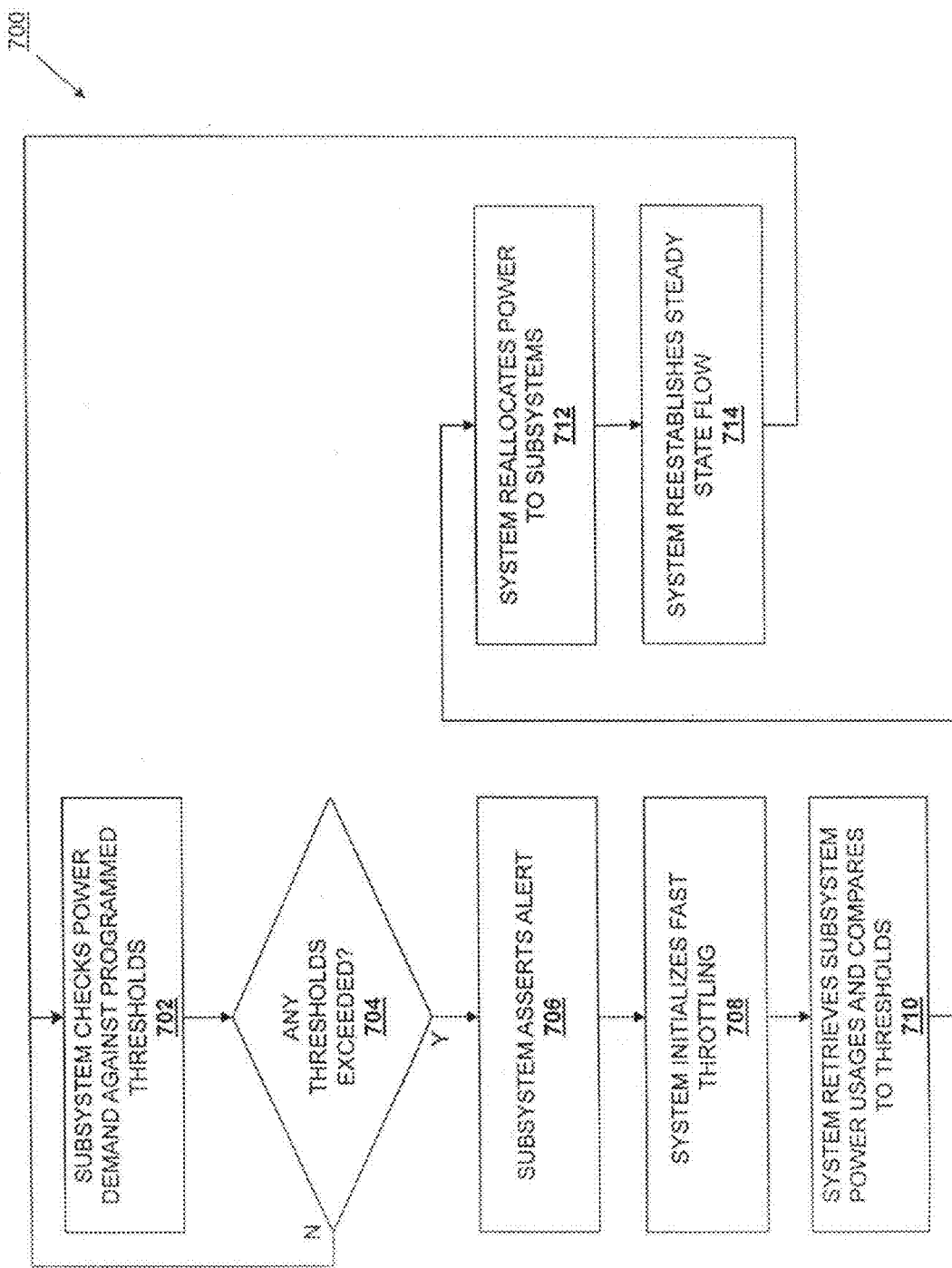
FIG. 7 is a flow chart illustrating an embodiment of a method for addressing an exceeded threshold during the method for dynamically allocating a power budget of FIG. 6.

In some situations, one or more of the powered subsystems may operate such that the power demand exceeds a programmed threshold even when the method 600 is performed. For example, a system may be set up to intentionally reduce the amount of power capping and bandwidth limiting (and associated "guard banding") that would be required to guarantee dynamic or peak power limits are never exceeded in order to improve system performance for normal operation, with the understanding that thresholds/alerts could occur that result in fast and dramatic system throttling for exceptional and/or infrequent peak workloads. In such a situation, those powered subsystems may be operable to send an alert (e.g., as programmed in blocks 610 and/or 622 of the method 600) to ensure that the power system 202 does not exceed its power output capabilities. FIG. 7 illustrates a method 700 performed during such a situation. The method 700 begins at block 702 where a powered subsystem checks its current power demand against threshold(s) programmed in the powered subsystem. In an embodiment, the POL voltage regulator in the powered subsystem is operable to check the threshold(s) programmed in the POL voltage regulator to determine whether the power demand from the powered component in the powered subsystem exceeds the threshold(s).

The method 700 then proceeds to decision block 704 where the powered subsystem determines whether any thresholds have been exceeded. While, because of the method 600, the exceeding of a threshold in a powered component is expected to be a rare or infrequent occurrence, unexpected power excursions are always a possibility in any system and can be dealt with using the method 700. In an embodiment, the POL voltage regulator in the powered subsystem determines whether the programmed threshold(s) have been exceeded and, if not, the method 700 returns to block 702 to check the power demand of the powered subsystem against the programmed threshold(s). If, at decision block 704, the powered subsystem determines that one or more threshold(s) have been exceeded, the method 700 proceeds to block 706 where the powered subsystem asserts an alert. In an embodiment, the POL voltage regulator may determine that the power demand from the powered component in the powered subsystem exceeds the programmed threshold(s) and, in response, may interrupt the power system controller 204 and/or another system power management agent (e.g., via a PMBus Alert). In response to the assertion of the alert at block 706, the method 700 proceeds to block 708 where the system initializes fast throttling. In an embodiment, the power system controller 204 or other system power management agent receives the alert and performs a system level fast throttle that provides a failsafe operation to protect the power system 202 and/or the powered subsystems. In an embodiment, system level fast throttling may be based on a level of the threshold exceeded, and may result in, for example, processor performance state capping in the processor subsystem 206, memory power capping (e.g., RAPL) in the memory subsystem 208, memory bandwidth capping in the memory subsystem 208, I/O bandwidth capping in the I/O subsystem 214, fan RPM capping in the other system components subsystem 218, PCIe dynamic power budget capping, and/or a variety of other system level fast throttling actions known in the art.

Following the system level fast throttling at block 708, the method proceeds to block 710 where the system retrieves powered subsystem power usage data and compares that data to the programmed thresholds. In an embodiment, the power system controller 204 retrieves the power usage data from the powered subsystems subsequent to the system level fast throttling to determine system power requirements similarly as described above for blocks 614, 616, and 618 of the method 600. The method 700 then proceeds to block 712 where the system reallocates power to the subsystems based on the system power requirements determined in block 710 similarly as discussed above for blocks 620 and 622 of the method 600. In an embodiment, the power system controller 204 reallocates the power budget of the power system 202 to provide dynamic and peak power requirements of the powered subsystems based on the power usage data retrieved at the time of the assertion of the interrupt at block 706 and, in some cases, the power usage history of prior time intervals, to allocate power such that subsequent system level fast throttling events can be avoided. The method 700 then proceeds to block 714 where the system reestablishes steady state flow according to the method 600, where the power budget of the power system 202 is reallocated amongst the powered components for each subsequent time interval based on their operation during a current time interval, and the method 700 returns to block 702 and decision block 704 where the powered subsystems again operate to determine whether any programmed thresholds are being exceeded.

Thus, a system and method have been described that actively monitor and control the dynamic power requirements and peak power requirements in the powered subsystems of an IHS, which allows excessive/unnecessary guard banding to be eliminated, and the power system (e.g., the PSUs), voltage regulators, and other power distribution elements to be sized and optimized for the average sustainable power requirements of the system rather than accommodating the unlikely scenario of the worst case peak power requirements of all the powered subsystems occurring simultaneously.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dynamic power budget allocation system, comprising:
   a plurality of powered subsystems;
   a power table database storing a peak power requirement for each of a plurality of operating modes available to each of the plurality of powered subsystems; and
   a power system controller coupled to the plurality of powered subsystems, wherein the power system controller is configured, for each of a plurality of time intervals, to:
      retrieve current power usage data from each of the plurality of powered subsystems during a current time interval while each of the plurality of powered subsystems operate in a respective current operating mode of the plurality of operating modes available to that powered subsystem;
      determine a respective subsequent operating mode of the plurality of operating modes that is available to each of the plurality of powered subsystems in a subsequent time interval via immediate transition from the respective current operating mode at which that powered subsystem is operating, wherein the subsequent operating mode for each powered subsystem is a worst case scenario that is reachable within the subsequent time interval for each powered subsystem, and wherein at least one of the respective subsequent operating modes for a respective powered subsystem is less than a maximum operating mode that causes that powered subsystem to operate with a maximum peak power requirement;

retrieve, from the power table database, the peak power requirement for each respective subsequent operating mode that is available to each of the plurality of powered subsystems in the subsequent time interval via immediate transition from the respective current operating mode at which that powered subsystem is operating;

project subsequent power requirements for each of the plurality of powered subsystems for the subsequent time interval by using the current power usage data and the peak power requirement for the respective subsequent operating modes that are available to each of the plurality of powered subsystem in the subsequent time interval via immediate transition from the respective current operating mode at which that powered subsystem is operating to determine an upper bound on a subsequent power demand of each powered subsystem in the subsequent time interval;

determine at least one power setting for at least one of the plurality of powered subsystems using the subsequent power requirements; and program the at least one of the plurality of powered subsystems with the at least one power setting.

2. The dynamic power budget allocation system of claim 1, wherein each of the powered subsystems includes at least one powered subsystem component coupled to a powered subsystem voltage regulator, and wherein the subsystem voltage regulator is configured to provide the power system controller with the current power usage data and to be programmed with the at least one power setting.

3. The dynamic power budget allocation system of claim 1, wherein the power system controller includes a database that stores a power history including prior power usage data from a plurality of prior time intervals, and wherein the power system controller also uses the power history to determine the at least one power setting for the at least one of the plurality of powered subsystems.

4. The dynamic power budget allocation system of claim 1, wherein the subsequent power requirements include dynamic power requirements that include a plurality of different durations and duty cycles.

5. The dynamic power budget allocation system of claim 1, wherein the using the current power usage data and the peak power requirement for the subsequent operating mode that is reachable by each of the plurality of powered subsystems to determine the upper bound on the subsequent power demand of each powered subsystem in the subsequent time interval includes using a current operating mode that is included in the current power usage data to determine a time needed for each powered subsystem to transition to the subsequent operating mode that consumes more power to determine the upper bound on the subsequent power demand of each powered subsystem in the subsequent time interval.

6. The dynamic power budget allocation system of claim 1, wherein power system controller is further configured to:

program at least one of the plurality of powered subsystems with a threshold.

7. The dynamic power budget allocation system of claim 1, wherein the current power usage data retrieved from each of the plurality of powered subsystems during the current time interval includes average power usage, peak power usage, dynamic power usage over one or more time intervals, and programmed threshold status.

8. An information handling system (IHS), comprising:
a chassis;
a processor system located in the chassis;
a memory system located in the chassis and coupled to the processor system;
a power table database storing peak power requirements for each of a plurality of operating modes available to each of the processor system and the memory system; and
a power system controller coupled to the processor system and the memory system, wherein the power system controller is configured, for each of a plurality of time intervals, to:

retrieve current power usage data from the processor system and the memory system during a current time interval while the processor system and memory system operate in a respective current operating mode of the plurality of operating modes available to the processor system and the memory system;

determine a respective subsequent operating mode of the plurality of operating modes that is available to each of the processor system and the memory system in a subsequent time interval via immediate transition from the respective current operating mode at which the processor system or memory system is operating, wherein the subsequent operating mode for each of the processor system and the memory system is a worst case scenario that is reachable within the subsequent time interval for each powered subsystem, and wherein at least one of the respective subsequent operating modes for the processor system and the memory system is less than a maximum operating mode that causes the processor system and the memory system to operate with a maximum peak power requirement;

retrieve, from the power table database, peak power requirements for each respective subsequent operating mode that is available to each of the processor system and the memory system in the subsequent time interval via immediate transition from the respective current operating mode at which the processor system and the memory system is operating;

project subsequent power requirements for the processor system and the memory system for the subsequent time interval by using the current power usage data and the peak power requirement for the respective subsequent operating modes that are available to each of the processor system and the memory system in the subsequent time interval via immediate transition from the respective current operating mode at which each of the processor system and the memory system is operating to determine an upper bound on a subsequent power demand of each of the processor system and the memory system in the subsequent time interval;

determine at least one power setting for at least one of the processor system and the memory system using the subsequent power requirements; and program the at least one of the processor system and the memory system with the at least one power setting.

9. The IHS of claim 8, wherein the processor system includes at least one processor coupled to a processor voltage regulator that is configured to provide the power system controller with current processor power usage data and to be programmed with the at least one processor power setting, and wherein the memory system includes at least one memory device coupled to a memory voltage regulator that is operable to provide the power system controller with current memory power usage data and to be programmed with the at least one memory power setting.

10. The IHS of claim 8, wherein the power system controller includes a database that stores a power history including prior power usage data from a plurality of prior time intervals, and wherein the power system controller also uses the power history to determine the at least one power setting for the at least one of the processor system and the memory system.

11. The IHS of claim 8, wherein the subsequent power requirements include dynamic power requirements that include a plurality of different durations and duty cycles.

12. The IHS of claim 8, wherein the using the current power usage data and the peak power requirement for the subsequent operating mode that is reachable by each of the processor system and the memory system to determine the upper bound on the subsequent power demand of each of the processor system and the memory system in the subsequent time interval includes using a current operating mode that is included in the current power usage data to determine a time needed for each of the processor system and the memory system to transition to the subsequent operating mode that consumes more power to determine the upper bound on the subsequent power demand of each powered subsystem in the subsequent time interval.

13. The IHS of claim 8, wherein power system controller is further configured to:
    program at least one of the processor system and the memory system with a threshold.

14. The IHS of claim 8, wherein the current power usage data retrieved from each of the processor system and the memory system during the current time interval includes average power usage, peak power usage, dynamic power usage over one or more time windows, and programmed threshold status.

15. A method for dynamic power budget allocation in an information handling system (IHS), comprising:
    retrieving current power usage data from each of a plurality of IHS subsystems during a current time interval while each of the plurality of IHS subsystems operate in a respective current operating mode of the plurality of operating modes available to that IHS subsystem;
    determining a respective subsequent operating mode of the plurality of operating modes that is available to each of the plurality of IHS subsystems in a subsequent time interval via immediate transition from the respective current operating mode at which that IHS subsystem is operating, wherein the subsequent operating mode for each IHS subsystem is a worst case scenario that is reachable within the subsequent time interval for each IHS subsystem, and wherein at least one of the respective subsequent operating modes for a respective IHS subsystem is less than a maximum operating mode that causes that IHS subsystem to operate with a maximum peak power requirement;
    retrieving a peak power requirement for each respective subsequent operating mode that is available to each of the plurality of IHS subsystems in the subsequent time interval via immediate transition from the respective current operating mode at which that IHS subsystem is operating;
    projecting subsequent power requirements for each of the plurality of IHS subsystems for the subsequent time interval by using the current power usage data and the peak power requirement for the respective subsequent operating modes that are available to each of the plurality of IHS subsystem in the subsequent time interval via immediate transition from the respective current operating mode at which that IHS subsystem is operating to determine an upper bound on a subsequent power demand of each IHS subsystem in the subsequent time interval;
    determining at least one power setting for at least one of the plurality of IHS subsystems using the subsequent power requirements; and
    programming the at least one of the plurality of IHS subsystems with the at least one power setting.

16. The method of claim 15, wherein each of the plurality of IHS subsystems includes at least one IHS subsystem component coupled to an IHS subsystem voltage regulator, and wherein the IHS subsystem voltage regulator provides the power system controller with the current power usage data and to be programmed with the at least one power setting.

17. The method of claim 15, wherein the power system controller includes a database that stores a power history including prior power usage data from a plurality of prior time intervals, and wherein the power system controller also uses the power history to determine the at least one power setting for the at least one of the plurality of IHS subsystems.

18. The method of claim 15, wherein the subsequent power requirements include dynamic power requirements that include a plurality of different durations and duty cycles and peak power requirements.

19. The method of claim 15, further comprising:
    programming at least one of the plurality of IHS subsystems with a threshold.

20. The method of claim 15, wherein the current power usage data retrieved from each of the plurality of IHS subsystems during the current time interval includes average power usage, peak power usage, dynamic power usage over one or more time windows, and programmed threshold status.

* * * * *